United States Patent [19]
Kaneko et al.

[11] Patent Number: 4,779,260
[45] Date of Patent: Oct. 18, 1988

[54] RECORDING OR REPRODUCING DEVICE

[75] Inventors: Kiyotaka Kaneko; Katsuo Nakadai; Izumi Miyake; Kazuya Oda, all of Kanagawa, Japan

[73] Assignee: Fuji Photo Film Co., Ltd., Minami-ashigara, Japan

[21] Appl. No.: 823,111

[22] Filed: Jan. 27, 1986

[30] Foreign Application Priority Data

Jan. 26, 1985 [JP] Japan .................................. 60-13136

[51] Int. Cl.⁴ ........................ A02P 6/02; G11B 19/22
[52] U.S. Cl. .................................... 369/266; 318/373; 360/74.1; 369/268
[58] Field of Search ...................... 369/266, 267, 268; 318/373, 371; 360/74.1

[56] References Cited

U.S. PATENT DOCUMENTS

| | | | |
|---|---|---|---|
| 3,500,163 | 3/1970 | Moritz | 318/373 |
| 4,417,288 | 11/1983 | Hattor et al. | 369/268 |
| 4,457,008 | 6/1984 | Nakatan et al. | 353/26 A |
| 4,549,120 | 10/1985 | Banno et al. | 318/373 |

*Primary Examiner*—Steven L. Stephan
*Attorney, Agent, or Firm*—Cushman, Darby & Cushman

[57] ABSTRACT

A recording or reproducing device in which current is supplied to the spindle motor which drives the disk to produce reverse torque in response to a stop signal when the disk is rotating. The beginning of reverse rotation is detected and the supply interrupted in response thereto.

23 Claims, 7 Drawing Sheets

RECORDING OR REPRODUCING DEVICE

BACKGROUND AND SUMMARY OF THE INVENTION

The invention relates to an improved recording or reproducing device, such as a magnetic disc.

In recording or reproducing devices using rotary recording media such as magnetic disks, a center core integral with the recording medium is typically fitted on the spindle to load the recording medium.

FIG. 5 shows one example of a magnetic disk cassette of this type. In cassette 1, a center core 2 and a magnetic disk 3 are rotatably incorporated in a jacket 4. When the shutter 5 of cassette 1 is opened, disk 3 is exposed to confront a magnetic head (not shown). Further, in FIG. 5, an elastic member 2a is formed by part of the center core 2. Elastic member 2a is adapted to push the spindle to center the magnetic disk. A PG yoke 6 is buried in the center core 2, in order to detect the rotational phase of the magnetic disk 3.

FIGS. 6 through 8 show one example of a mechanism for mounting the magnetic disk on the spindle. As shown in FIG. 6, a spindle motor 7 is secured to a recording or reproducing body 8, and spindle 7a of the motor 7 has a magnet 9, which is magnetically coupled to a magnetic member fixedly provided on the lower surface of the center core 2. A jacket holder 10 is pivotally mounted on body 8 about a hinge shaft 11. Jacket holder 10 has an opening 10a at one end to receive jacket 4. An outer cover 12 is mounted on body 8 in such a manner that it also pivots about hinged shaft 11. A lock pin 13 is embedded in the front wall 12a of the outer cover 12. A center core pushing member 14 is provided at the central part of the inner surface of the top wall of the outer cover 12. Member 14 is used to push the center core of the magnetic disk to fit the latter on the spindle 7a (as described later).

The operation of the magnetic disk mounting mechanism will be described with reference to FIGS. 7 and 8. First, as shown in FIG. 6, cassette jacket 4 is inserted into holder 10 through opening 10a. Next, cover 12 is swung clockwise about hinge shaft 11 against the elastic force of a spring (not shown), whereby the holder 10 is swung in the same direction about hinge shaft 11. As a result, center core pushing member 14 is abutted against the top surface of the center core 2 to push center core 2 onto spindle 7a. Magnet 9 of spindle 7a attracts a magnetic member 15 of center core 2, to fix center core 2. When, under the condition shown in FIG. 7, the cover 12 is released, the cover 12 is turned slightly counterclockwise by the elastic force of the spring (not shown), and a lock mechanism 16 provided on the body 8 acts on lock pin 13 to lock the latter as shown in FIG. 8. In FIG. 8, center core pushing member 14 retracts above center core 2. Under this condition, spindle motor 7 is energized to turn the magnetic disk 3 so that recording or reproducing is carried out by a conventional magnetic head (not shown). When the lock mechanism 16 is released after recording or reproducing, outer cover 12 and holder 10 are swung counterclockwise by the spring (not shown), thus being restored to the position shown in FIG. 6.

FIG. 9 shows a control circuit for spindle motor 7. The control circuit employs a servo loop which is typical for a recording or reproducing circuit of this type.

A PG pickup 20 confronts PG yoke 6 of center core 2. PG pickup 20 detects the leakage flux of PG yoke 6 to generate a PG pulse $S_1$ representing the rotational phase of magnetic disk 3. The PG pulse $S_1$, after being amplified by an amplifier 21, is compared with a reference phase signal (such as a vertical synchronizing signal) $S_0$ in a conventional phase comparator 22. In phase comparator 22, a trapezoidal wave formed from the reference phase signal $S_0$ is gated with the PG pulse $S_1$, so that, when the phase of the PG pulse $S_1$ leads that of the trapezoid wave, a relatively low error voltage $S_2$ is outputted, and when the phase of the PG pulse lags that of the trapezoid wave, a relatively high error voltage $S_2$ is outputted. The error voltage $S_2$ acts on the spindle motor 7 so that the rotational phase of the magnetic disk 3 is synchronized with the reference phase signal $S_0$.

The error voltage $S_2$ is applied to a phase compensating circuit 23 which is either a phase lag circuit or a phase lead circuit. An error voltage $S_3$ provided at the output terminal of the circuit 23 is added to a speed control signal S of a speed servo system, and the result of this addition is applied to a switch 24.

The speed control signal $S_7$ is obtained as follows. A frequency signal PG representing the speed of rotation of the spindle motor 7 is obtained from a frequency generator 29, and converted into a DC voltage signal V by a frequency-to-voltage converter 25. The DC voltage signal V is applied to a DC filter 26 to obtain the speed control signal $S_7$.

Switch 24 is an analog switch which is turned on and off by a motor control signal $S_6$. That is, when the control signal $S_6$ is at the level "0", the switch is turned off to interrupt the transmission of the signal $S_4$. The voltage signal $S_4$ provided at the output terminal of the switch 24, after being amplified by an amplifier 27, is applied, as a drive voltage signal $S_5$, to a motor drive amplifier 28. Amplifier 28 is adapted to perform switching (commutation) and amplifying, so that an exciting current I corresponding to the voltage signal $S_5$ is supplied to the DC spindle motor 7.

In the above-described recording or reproducing device, the center core 2 of the magnetic disk 3 is pushed and fitted on the spindle 7a by the magnetic disk mounting device of FIGS. 6 through 8. Under the condition shown in FIG. 8, the motor control signal $S_6$ of the level "1" is applied to the switch 24 to excite the spindle motor 7, to thereby rotate magnetic disk 3. After recording or reproducing, the motor control signal $S_6$ of the level "0" is applied to the switch 24, to interrupt the application of the voltage signal $S_4$ and accordingly the supply of the exciting current I. Thereafter, the lock mechanism 16 is released to restore the outer cover 12 and the jacket holder 10 as shown in FIG. 6.

Even if the supply of the exciting current I is interrupted by turning off switch 24, the spindle motor 7 is kept turned on for a while by the inertia of the magnetic disk 3, the rotor, etc. Under this condition, sometimes the operator opens the outer cover 12 and the jacket holder 10 while the motor is still being rotated to disengage the center core 2 of the magnetic disk 3 from the spindle 7a, and immediately replaces the cassette 1 with another one and closes the cover 12 and the jacket holder 10, or slightly opens the cover and the jacket and closes them without replacing the cassette 1. In this case, the center core 2 is fitted on the spindle 7a which is still turning. As a result, the surface of the center core 2 which are brought into contact with the spindle 7a and the center core pushing member 14 are greatly worn, which lowers the durability of the center core 2.

In addition, it becomes difficult to positively fit or chuck the center core 2 on the spindle 7a. In this case, the disk 3 is rotated while inclined or eccentric, which adversely affects recording or reproducing, thus lowering the quality of the recorded or reproduced picture, for instance, in the case of a still video floppy disk.

In view of the foregoing, an object of this invention is to provide a recording or reproducing device in which the time required for a spindle motor adapted to rotate a rotary recording medium such as a magnetic disk to stop is decreased, so that safe removal of a rotary recording medium from the spindle and mounting another one on it immediately thereafter is possible.

The foregoing object of the invention has been achieved by a recording or reproducing device having recording medium loading means for loading a rotary recording medium by fitting the center core of the rotary recording medium on the spindle of a spindle motor. Exciting currents are supplied to cause the spindle motor to produce reverse torque in response to a control signal to sotp which is given when the spindle motor is rotating the rotary recording medium. Reversal of the direction of rotation of the spindle motor is detected and the supply of the exciting currents to the spindle motor interrupted in response to the detection signal.

When recording or reproducing is finished or suspended, a stop signal is produced. In response to the stop signal, the spindle motor produce reverse torque. The reverse torque is the deceleration torque which provides a large negative acceleration, and it is electrically produced. The spindle motor is quickly decelerated by the reverse torque. As soon as the spindle motor is stopped, the spindle motor begins to rotate in the opposite direction. However, at the instant when the motor begins rotating in the opposite direction, a detection signal is produced in response to interrupt the supply of the exciting current, as a result of which the spindle motor is stopped.

As is apparent from the above description, after the stop signal is provided, the inversion torque acts on the spindle motor until the latter is stopped. When the spindle motor begins rotating in the opposite direction, the torque becomes zero. Therefore, the spindle motor is positively and quickly stopped. Accordingly, when the rotary recording medium is removed from the spindle after recording or reproducing is finished or suspended, and the same or another rotary recording medium is loaded, the center core of the rotary recording medium is removed from or fitted on the spindle which is substantially stopped, and the center core pusher pushes a substantially stationary center core.

DETAILED DESCRIPTION OF THE INVENTION

Figure 1:
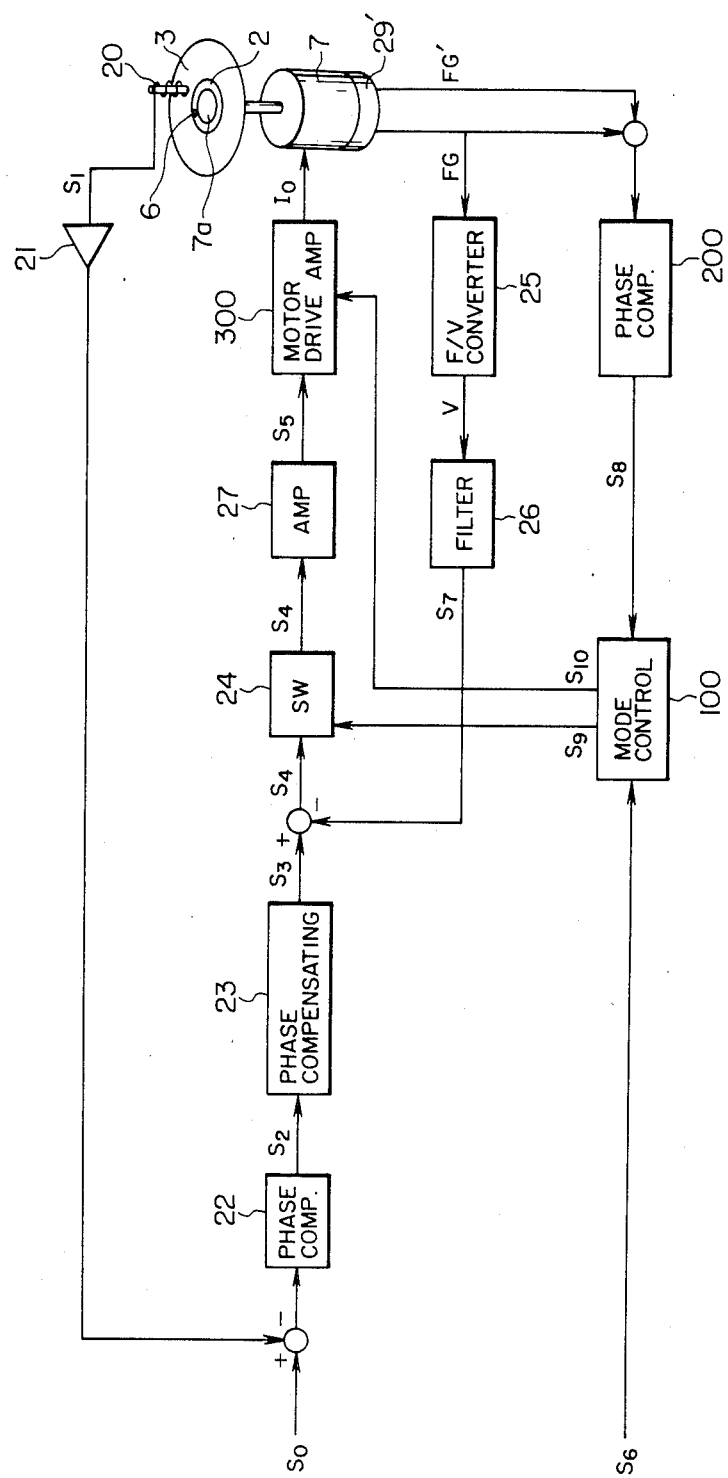
FIG. 1 is a block diagram showing a spindle motor control circuit for a recording or reproducing device which is one embodiment of this invention.

A spindle motor control circuit in a recording or reproducing device according to this invention will be described with reference to FIGS. 1 through 4. In these FIGS., parts corresponding functionally to those already described with reference to FIGS. 5–9 are designated by the same reference numerals or characters.

In FIG. 1, the motor control signal $S_6$ is supplied to a mode control section 100 rotation direction indicating signal $S_8$ is also applied that mode control unit 100 by a phase comparator 200. According to these signals $S_6$ and $S_8$, the mode control section 100 applies a first mode control signal $S_9$ to the switch 24 and a second mode control signal $S_{10}$ to a motor drive amplifier 300. When the first mode control signal $S_9$ is at the level "0", the switch 24 is turned on to transmit the voltage signal $S_4$ to the amplifier 27. When the signal $S_9$ is at the level "1", the switch 24 is turned off to interrupt the transmission of the signal $S_4$. As is described later, when the second mode control signal $S_{10}$ is at the level "0", the motor drive amplifier 300 operates to cause the spindle motor 7 to produce torque in the forward direction, and when the second mode control signal $S_{10}$ is at the level "1", the amplifier 300 operates to cause the spindle motor 7 to produce torque in the reverse direction. According to the phase relation between two frequency signals FG and FG′ provided by a two-phase frequency generator 29′, the phase comparator 200 applies the signal $S_8$ indicating the direction of rotation of the spindle motor 7 to the mode control section 100.

Figure 2:
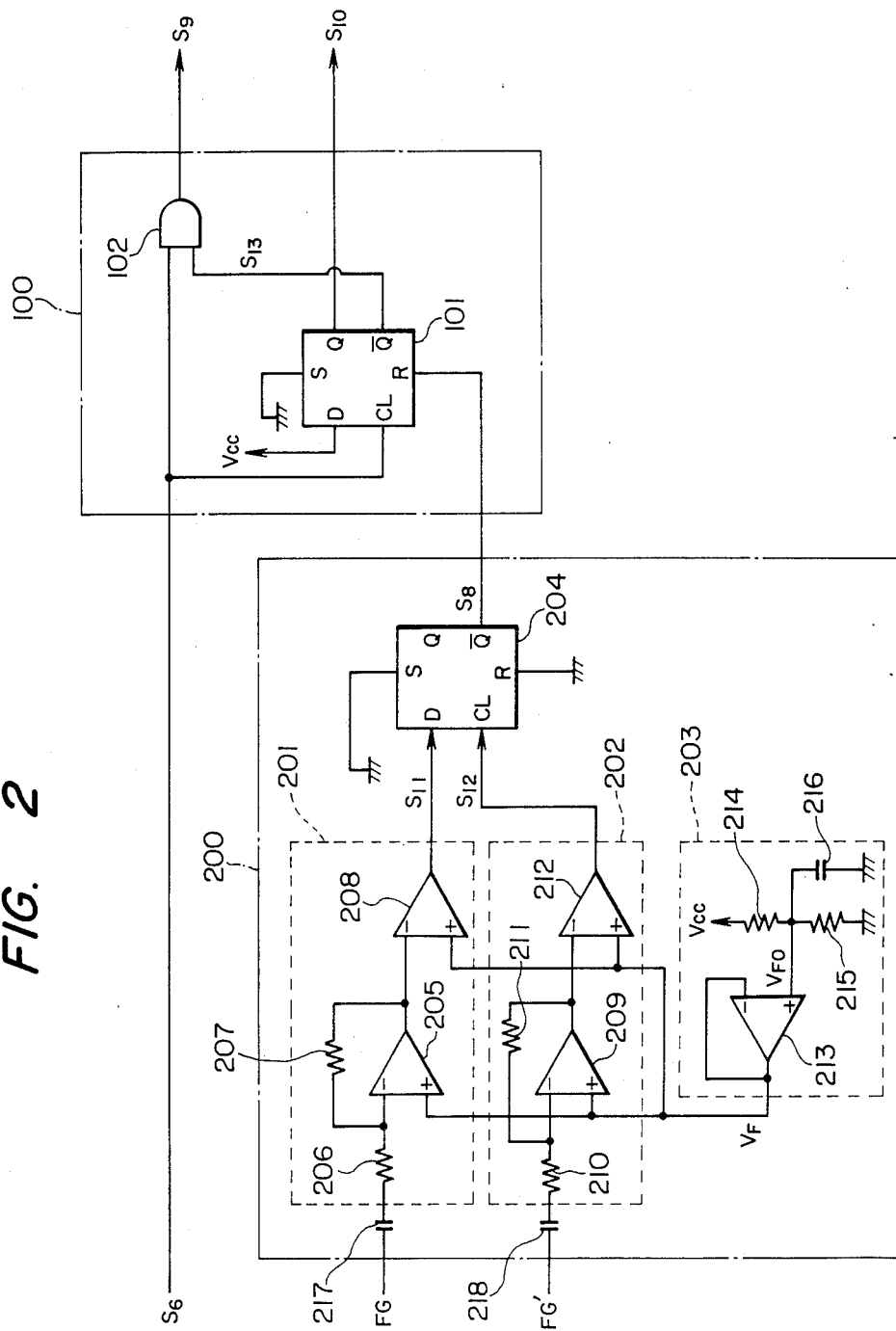
FIG. 2 is a circuit diagram showing a mode control section 100 and a phase detector 200 in the embodiment shown in FIG. 1.

FIG. 2 shows the arrangement of the mode control section 100 and the phase comparator 200.

Figure 3:
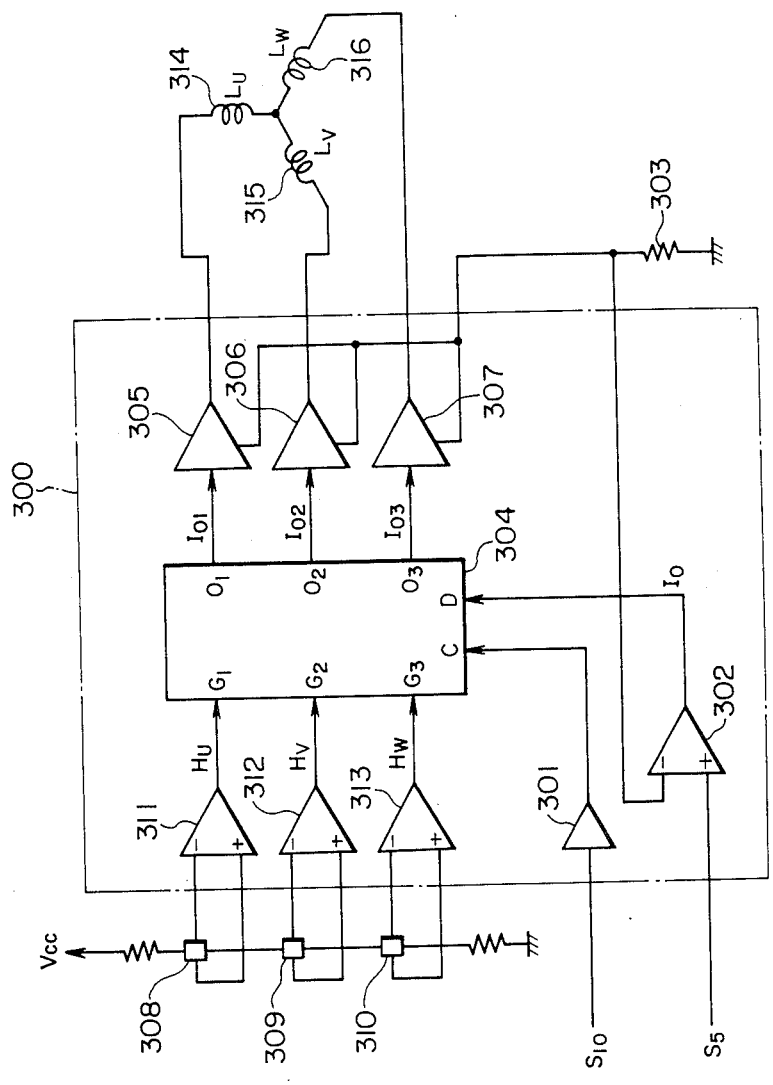
FIG. 3 is a circuit diagram showing a motor drive amplifier 300 in the embodiment.

The mode control section 100 includes a D flip-flop 101, and an AND gate 102. The motor control signal $S_6$ is applied to the clock input terminal CL of the flip-flop 101, and one of the input terminals of the AND gate 102. The data input terminal D of the flip-flop 101 is connected to a "1" level (Vcc potential), and the set terminal S is connected to a "0" level (ground potential). The reset terminal R of the flip-flop 101 receives the rotation direction indicating signal $S_8$ from the phase comparator 200. When the motor control signal $S_6$ is raised to "1" from "0", the flip-flop 101 clocks in the data input "1" and provides output signals "1" and "0" at the output terminals Q and $\overline{Q}$, respectively. When the rotation direction indicating signal $S_8$ is raised to "1" from "0", the flip-flop 101 is reset, so that output signals "0" and "1" are provided at the output terminals Q and $\overline{Q}$, respectively. The output signal $S_{13}$ provided at the inversion output terminal $\overline{Q}$ is applied to the other input terminal of the AND gate 102, and the output voltage of the latter gate 102 is applied as the first mode control signal $S_9$ to the switch 24. The output signal provided at the output terminal Q of the flip-flop 101 is supplied, as the second mode control signal $S_{10}$, to the motor drive amplifier 300 (FIG. 3).

The phase comparator 200 includes waveform shaping circuits 201 and 202, a reference voltage generating circuit 203, and a D flip-flop 204. In the waveform shaping circuit 201, an operational amplifier 205 and resistors 206 and 207 form an inversion amplifier, and an operational amplifier 208 forms a voltage comparator. Similarly, in the waveform shaping circuit 202, an operational amplifier 209 and resistors 210 and 211 form an inversion amplifier, and an operational amplifier 212 forms a voltage comparator. The reference voltage generating circuit 203 includes an operational amplifier 213. The non-inversion input terminal (+) of the operational amplifier 213 receives a reference voltage $V_{FO}$ which is provided by resistors 214 and 215 and a capacitor, and the inversion input terminal (−) thereof is connected directly to the output terminal of the operational amplifier 213. A reference voltage $V_F$ provided at the output terminal of the operational amplifier 213 is applied to the non-inversion input terminals (+) of the operational amplifiers 205, 208, 209 and 212.

The two frequency signals FG and FG' different in phase, for instance by 90°, provided by two-phase frequency generator 29' are so designed that, when the spindle motor 6 is rotated in the forward direction, the signal FG leads the signal FG' by a phase angle of 90°, and when the motor 7 is rotated in the reverse direction the signal FG lags the signal FG' by a phase angle of 90°. In FIG. 2, the frequency signals FG and FG' are applied through capacitors 217 and 218 to the inversion amplifiers (205, 206 and 207) and (209, 210 and 211), respectively, where they are subjected to inversion and amplification. The outputs of the inversion amplifiers are applied to the voltage comparators 208 and 212, respectively, where they are compared with the reference voltage $V_F$ set at a middle level, so as to be shaped into square-wave pulse signals $S_{11}$ and $S_{12}$, respectively. These pulse signals $S_{11}$ and $S_{12}$ are supplied to the data input terminal D and the clock input terminal CL of the D flip-flop 204, respectively.

The set terminal S and the reset terminal R of the flip-flop 204 are connected to the "0" level (ground potential). In the D flip-flop 204, with the rise of the clock input $S_{12}$, the logic state of the data input $S_{11}$ is received, and an output signal having a logic state opposite to that logic state is provided at the inversion output terminal $\overline{Q}$. More specifically, if, when the pulse $S_{12}$ is raised to "1" from "0", the pulse $S_{11}$ is at "1", then an output voltage of "0" is provided at the output terminal $\overline{Q}$, and if the pulse $S_{11}$ is at "0" when the pulse $S_{12}$ is raised to "1", then an output voltage of "1" is obtained at the output terminal $\overline{Q}$. The output voltages indicate the relative phase relationships between the pulse signals $S_{11}$ and $S_{12}$ (the frequency signals FG and FG'), thus showing the direction of rotation of the spindle motor 7. The output signal of "0" or "1" is applied, as the rotation direction indicating signal $S_8$, to the mode control section 100.

FIG. 3 is a circuit diagram showing the arrangement of the motor drive amplifier 300. In FIG. 3, the drive voltage signal $S_5$ from the amplifier 27 (FIG. 1) is applied to the non-inversion input terminal (+) of an operational amplifier 302. The inversion input terminal (−) of amplifier 303 is connected to voltage amplifier stage drivers 305, 306 and 307. The operational amplifier 302 forms a voltage-to-current converter. As the voltage signal $S_5$ changes, i.e., the input voltages applied to the operational amplifier 302 become different from each other, the amount of current flowing in the feedback resistor 303 is also increased. The voltage thus increased is fed back to the inversion input terminal (−) of the operational amplifier 302, whereby the imaginary short condition is maintained. The output current $I_0$ of the operational amplifier 302 is applied to an input terminal D of a three-phase logic circuit 304. The mode control signal $S_{10}$ from the mode control section 100 is applied through a buffer circuit 301 to an input terminal C of the three-phase logic circuit 304. Spindle motor 7 is a brushless DC motor with position detecting elements 308, 309 and 310. The position detection signals $H_U$, $H_V$ and $H_W$ of the position detecting elements 308, 309 and 310 are applied through amplifiers 311, 312 and 313 to input terminals $G_1$, $G_2$ and $G_3$ of the three-phase logic circuit 304 selectively allots the exciting current $I_0$ to the windings 314, 315, 316 of the phases $L_U$, $L_V$ and $L_W$ of the spindle motor (brushless DC motor) 7.

Furthermore, according to the logic state of the mode control signal $S_{10}$ applied to the control input terminal C, the three-phase logic circuit 304 controls the switching of the exciting current $I_0$ applied to the spindle motor 7. More specifically, when the mode control signal $S_{10}$ is at "0", the three-phase logic circuit 304 is placed in the forward rotation mode. When, in this case, the position detection signals are switched in the order of $H_U$—$H_V$—$H_W$, the exciting currents $I_{01}$, $I_{02}$ and $I_{03}$ are distributed through the output terminals $0_1$, $0_2$ and $0_3$ to the windings 314, 315 and 316 in the stated order ($I_{01}$—$I_{02}$—$I_{03}$), respectively, whereby torque is produced in the forward direction. On the other hand, when the mode control signal $S_{10}$ is at "1", the three-phase logic circuit 304 is placed in the reverse torque mode. When, in this case, the position detection signals are switched in the order of $H_U$—$H_V$—$H_W$, the exciting currents $I_{01}$, $I_{02}$ and $I_{03}$ are distributed in the order of $I_{03}$, $I_{02}$ and $I_{01}$ to the windings 314, 315 and 316, respectively, whereby torque is produced in the reverse direction.

The operation of the embodiment will be described with reference to FIG. 4.

When the spindle motor 7 is normally rotated with center core 2 of the recording or reproducing magnetic disk 3 mounted on the spindle 7a, the motor control signal $S_6$ is at "0". In this case, the "0" level signal $S_6$ is applied to one input terminal of the AND gate 103 in the mode control section 100 (FIG. 2) and therefore the first mode control signal $S_9$ provided at the output terminal 103 of the AND gate 102 is at "0". Accordingly, the switch 24 (FIG. 1) is in the "on" state, so that the voltage signal $S_4$ is applied to the amplifier 27, and the drive voltage signal $S_5$ is supplied to the motor drive amplifier 300. On the other hand, when the spindle motor 7 is normally rotated, i.e. when it is rotated in the forward direction, the signal FG leads the signal FG' by a phase angle of about 90° as shown in FIG. 4. The relative phase relation of these signals is determined by the flip-flop 204 of the phase comparator 200 with the aid of the pulse signals $S_{11}$ and $S_{12}$ obtained by shaping the frequency signals FG and FG', as a result of which the rotation direction indicating signal $S_8$ of "0" is obtained at the inversion output terminal $\overline{Q}$ of the flip-flop 204 as shown in FIG. 4. That is, with the timing of each rise of the pulse $S_{12}$, the "1" level of the signal $S_{11}$ is applied to the data input terminal D of the flip-flop 204, and the logic level "0" obtained by inverting the "1" level thus applied is provided at the inversion output terminal $\overline{Q}$. The rotation direction indicating signal $S_8$ of "0" does not act on the flip-flop 101. On the other hand, the motor control signal $S_6$ of "0" is applied to the clock input terminal CL of the flip-flop 101, and therefore flip-flop 101 is not triggered thereby. Accordingly, the flip-flop 101 is maintained at reset. That is, the signal $S_{13}$ at the output terminal $\overline{Q}$ is at "1", while the signal $S_{10}$ at the output terminal Q is at "0", (FIG. 4). As the second mode control signal $S_{10}$ is at "0", the three-phase logic circuit 304 in the motor drive amplifier 300 operates in the forward torque mode, and performs the distribution of the exciting currents so that the spindle motor 7 produces torque in the forward direction.

Figure 4:
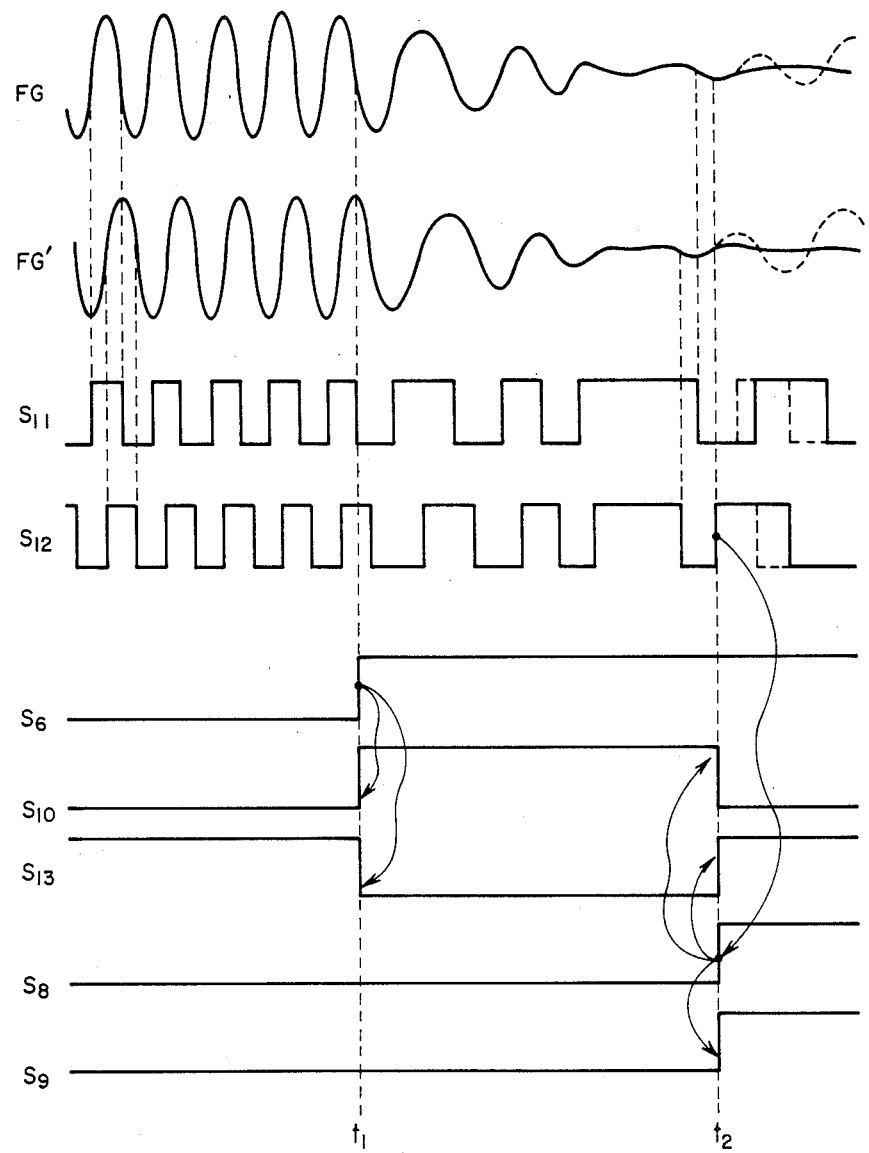
FIG. 4 is a timing chart showing various signals for a description of the operation of the embodiment.
Figure 5:
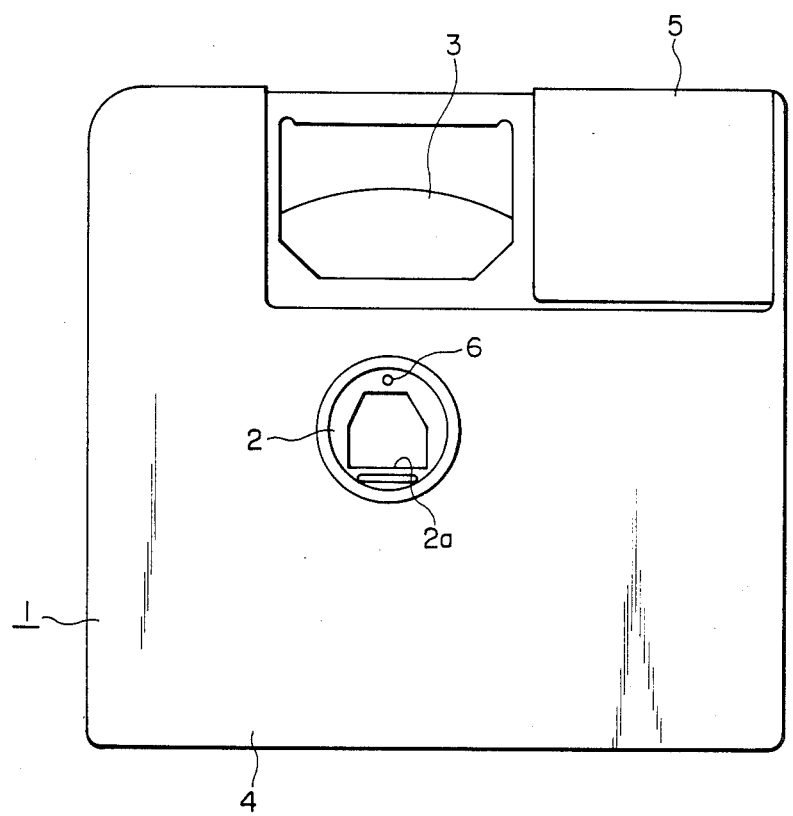
FIG. 5 is a plan view of a conventional magnetic disk cassette.
Figure 6:
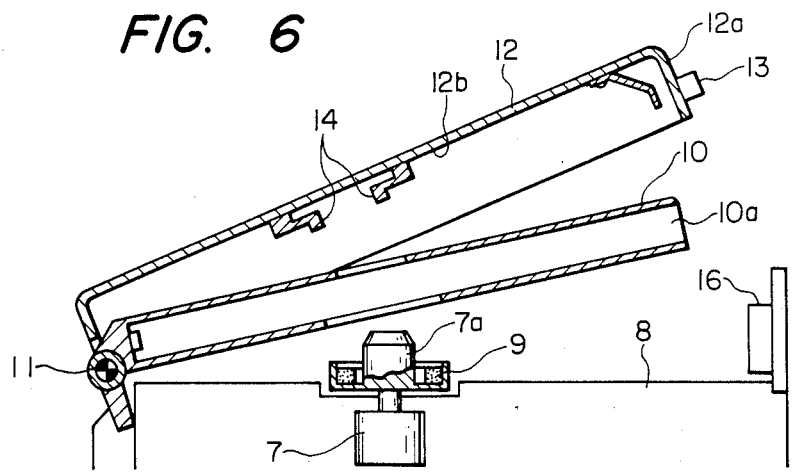
FIGS. 6, 7 and 8 are sectional views showing one example of rotary recording medium loading mechanism.
Figure 7:
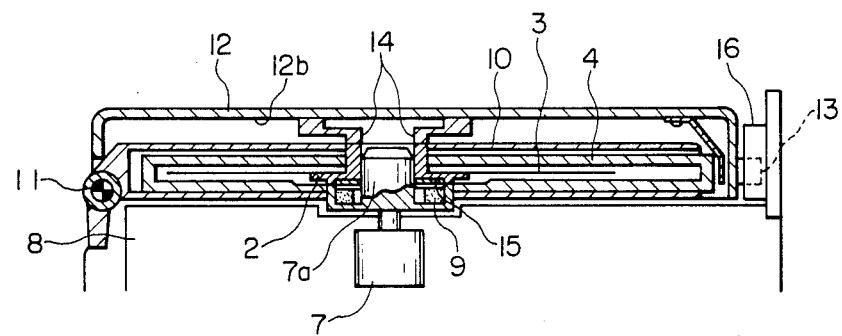
Figure 8:
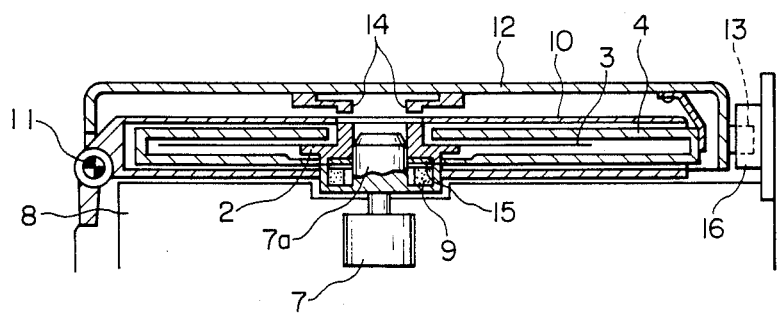
Figure 9:
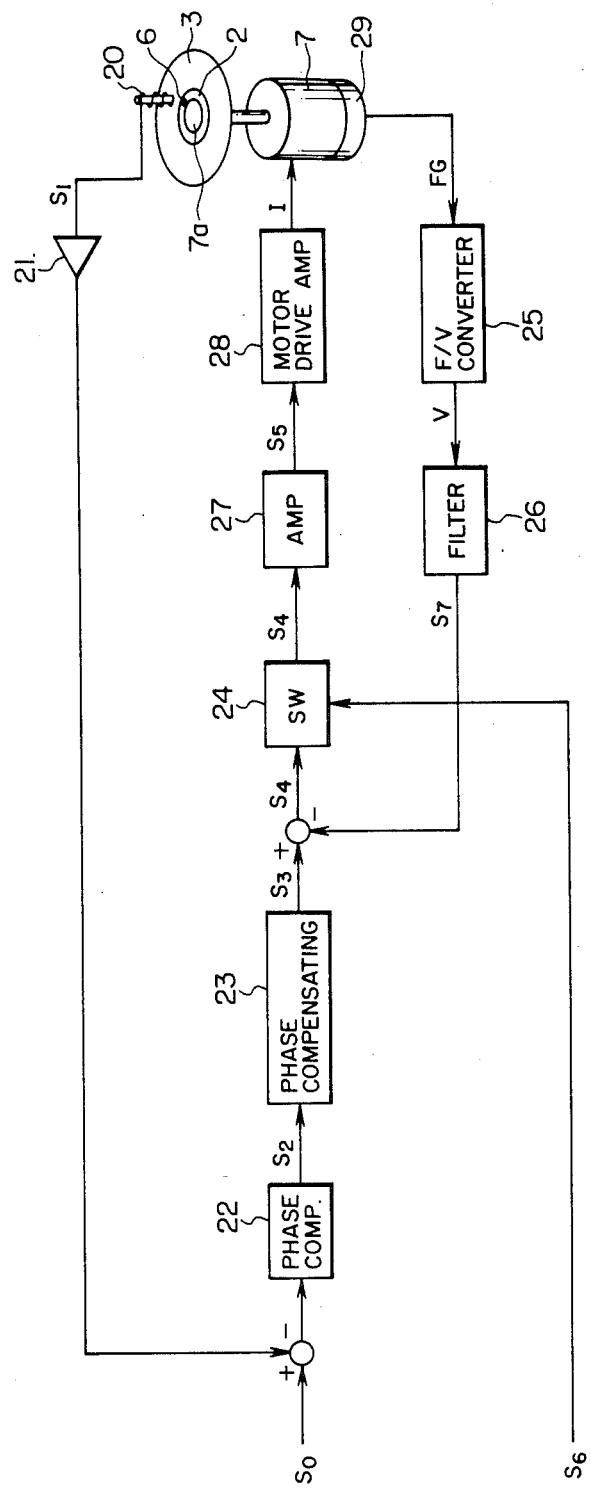
FIG. 9 is a block diagram showing the arrangement of a conventional spindle motor control circuit.

When the motor control signal $S_6$ is raised to "1" for indicating stop at the time instant $t_1$ in FIG. 4, the flip-flop 101 in the mode control section 100 is triggered so that the logic levels of the signals $S_{10}$ and $S_{13}$ provided at the output terminals Q and $\overline{Q}$ are changed as shown in FIG. 4. Accordingly, as one input terminal of the AND gate 102 receives the signal $S_{13}$ of "0" although the other input terminal receives the signal $S_6$ of "1", the first mode control signal $S_9$ provided at the output terminal is maintained at "1", and therefore the switch 24 is kept turned on (FIG. 1). When the second mode control signal $S_{10}$ is raised to "1", the operation mode of the three-phase logic circuit 304 in the motor drive amplifier 300 is switched over to the reverse torque mode. As a result, the three-phase logic circuit 304 distributes the exciting currents so that the spindle motor 7 produces torque in the reverse direction as described above. Therefore, the speed of the spindle motor 7 is abruptly decreased at a large negative acceleration by the action of the reverse torque, and the frequency signals FG and FG' having a frequency and a voltage which correspond to the speed of rotation thereof are abruptly attenuated as shown in FIG. 4. In the deceleration or brake mode, the direction of rotation of the spindle motor 7 is the forward direction, and therefore the relative phase relation of the frequency signals FG and FG' (pulse signals $S_{11}$ and $S_{12}$) is maintained unchanged, and the rotation direction indicating signal $S_8$ provided by the phase comparator 200 is maintained at "0" as shown in FIG. 4.

The spindle motor 7, being decelerated by the action of the reverse torque, is stopped, and then it is rotated in the opposite direction. Therefore, the frequency signal FG lags the frequency signal FG' by a phase angle of about 90°. Accordingly, when the pulse $S_{12}$ rises at the time instant $t_2$ immediately after the spindle motor is started to turn in the opposite direction, the pulse $S_{11}$ is set to "0". Therefore, the rotation direction indicating signal $S_8$ outputted by the phase comparator 200 is raised to "1", thus resetting the flip-flop 101 in the mode control section 100. Therefore, the signal $S_{13}$ at the inversion output terminal $\overline{Q}$ of the flip-flop 101 is set to "0". As the signal $S_{13}$ is raised to "1" as described above, the first mode control signal $S_9$ at the output terminal of the AND gate 102 is raised to "1", as a result of which the switch 24 (FIG. 1) is turned off to interrupt the transmission of the voltage signal $S_4$. When the second mode control signal $S_{10}$ is set to "0", the reverse torque mode of the three-phase logic circuit 304 of the motor drive amplifier 300 is switched over to the forward torque mode. However, since the switch 24 is turned off so that no drive voltage signal $S_5$ is applied to the motor drive amplifier 300, no exciting current is applied to the spindle motor 7, and therefore no torque is produced thereby. Accordingly, the spindle motor is stopped quickly.

As was described above, in response to the stop instructing control signal $S_6$ ("1"), the second mode control signal $S_{10}$ of the mode control section is raised to "1", so that the motor drive amplifier 300 is operated in the reverse torque mode to supply the exciting currents to the spindle motor for production of reverse torque.

As a result, the spindle motor 7 is quickly decelerated at a larger negative acceleration and substantially stopped in an extremely short time. When the spindle motor thus stopped is turned slightly in the opposite direction, the rotation direction indicating signal from the phase comparator 200 is raised to "1", and the first mode control signal $S_9$ provided by the mode control section 100 turns off the switch 24 to interrupt the transmission of the exciting currents to the spindle motor 7. As a result, no torque is produced, and the spindle motor 7 is stopped.

Therefore, even when the outer cover 12 and the jacket holder 10 (FIGS. 6 through 8) are opened immediately after the recording or reproducing operation, the center core 2 of the magnetic disk 3 is disengaged from the spindle which is substantially stopped. Furthermore, even when the magnetic disk 3 or another magnetic disk is loaded immediately thereafter, its center core 2 is fitted on the spindle 7a which is substantially stopped. Thus, the magnetic disk can be smoothly fitted on the spindle and removed therefrom, and set correctly.

In order to rotate the spindle motor again, the motor control signal $S_6$ is set to "0" as a for rotation instruction. As a result, the first mode control signal $S_9$ from the AND gate 12 (FIG. 2) is set to "0", and the switch 24 (FIG. 1) is turned on, so that the drive voltage signal $S_5$ is applied to the motor drive amplifier 300. The motor drive amplifier 300 supplies the exciting currents to the spindle motor 7 to produce the forward torque, because the operation mode of the motor drive amplifier 300 has been switched over to the forward torque mode when the spindle motor 7 stopped.

In the above-described embodiment, a brushless DC motor is employed. However, it is possible to use other servo motors such as for instance a DC motor with brushes. Furthermore, in addition to the aforementioned magnetic disk, a recording and reproducing disk or sheet of optical or electrostatic capacity type may be employed as the rotary recording medium in the invention.

Unlike the conventional method in which the supply of the exciting currents is merely interrupted to stop the spindle motor, the time required for stopping the spindle motor can be greatly reduced in the present invention. Accordingly, even when the rotary recording medium is removed from the spindle immediately after recording or reproducing and the rotary recording medium is loaded immediately thereafter, the center core of the rotary recording medium is removed from or fitted on a spindle which is substantially stopped, and the center core pushing means depresses a center core which is substantially stopped. The surface of the center core which are brought into contact with the spindle and the center core pushing member are thus less worn. Furthermore, as the center core is fitted on a spindle which is substantially stopped, the rotary recording medium can be positively set or chucked, which eliminates inclined or eccentric settings.

What is claimed is:

1. A recording or reproducing device for a recording medium comprising:
   means for holding the recording medium;
   means for driving said holding means to rotate said medium;
   circuit control means for supplying exciting currents to said driving means, including means for supplying exciting currents to cause said driving means to produce reverse torque in response to a stop signal and when said driving means is rotating said recording medium;

two phase frequency generator means, coupled to said driving means, for producing two signals which have a phase relationship depending on a direction of rotation of said driving means;

phase comparator means, connected to receive said two signals, for comparing said two signals to determine a direction of rotation of said driving means from a relationship between said two signals, and for producing a detection signal when said direction of rotation is reversed; and means for interrupting said exciting currents to said driving means in response to said detection signal.

2. Apparatus as in claim 1 wherein said recording medium includes a center core, said holding means includes a spindle adapted to mate with said center core, and said driving means drives said spindle.

3. Apparatus as in claim 1 wherein said phase comparator means comprises:

two wave-shaping means, each connected to receive one of said two signals for shaping said signal; and means for determining which of said two signals arrives first and producing an output signal indicative thereof.

4. Apparatus as in claim 3 wherein said determining means of said phase comparator means is a D-type flip flop, a clock input of said D-type flip flop receiving one of said shaped signals and a D-input of said D-type flip flop receiving the other of said shaped signals.

5. Apparatus as in claim 4 wherein said circuit control means comprises a D-type flip flop having a reset input connected to be reset by an output of said D-type flip flop of said determining means when the output indicates a reversed direction of said driving means.

6. Apparatus as in claim 1 wherein a phase difference between said two signals is 90°.

7. A control circuit for a recording or reproducing device which records or reproduces on or from a recording medium with a spindle motor and means for containing said recording medium onto the spindle of said motor comprising:

circuit means for supplying exciting currents to said spindle motor including means for supplying exciting currents to cause said spindle motor to produce reverse torque in response to a stop signal when said spindle motor is rotating said recording medium;

two phase frequency generator means, coupled to said spindle motor, for producing two signals which have a phase relationship depending on a direction of rotation of said spindle motor;

phase comparator means, connected to receive said two signals, for comparing said two signals to determine a direction of rotation of said spindle motor based on a relationship between said two signals, and producing a detection signal when the direction of rotation is reversed; and means for interrupting the supply of said exciting currents to said spindle motor in response to said detection signal.

8. A circuit as in claim 7 wherein said recording medium includes a center core, and said containing means fits the center core of said recording medium.

9. Apparatus as in claim 7 wherein said phase comparator means comprises:

two wave-shaping means, each connected to receive one of said two signals for shaping said signal; and means for determining which of said two signals arrives first and producing an output signal indicative thereof.

10. Apparatus as in claim 9 wherein said determining means of said phase comparator means is a D-type flip flop, a clock input of said D-type flip flop receiving one of said shaped signals and a D-input of said D-type flip flop receiving the other of said shaped signals.

11. Apparatus as in claim 10 wherein said circuit means includes a D-type flip flop having a reset input connected to be reset by said output of said D-type flip flop of said determining means when the output indicates a reversed direction of said spindle motor.

12. Apparatus as in claim 7 wherein a phase difference between said two signals is 90°.

13. A control circuit for driving a motor, comprising:

means for applying start and stop signals to the motor;

means for driving the motor in a first direction in response to said start signal, and for driving the motor to produce torque in a second direction reverse to said first direction in response to said stop signal;

two phase frequency generator means, coupled to said motor, for producing two signals which have a phase relationship depending on a direction of rotation of said motor;

phase comparator means, connected to receive said two signals, for comparing said two signals to determine a direction of rotation of the motor based on a relationship between said two signals; and means for interrupting said driving means from said driving to produce torque in said second direction, when said phase comparator means detects a motion of said motor being reversed.

14. A control circuit as in claim 13 further comprising a motor, and wherein said motor is adapted to drive a recording medium.

15. A circuit as in claim 13 wherein said driving means drives said motor by supplying exciting currents to said motor.

16. Apparatus as in claim 13 wherein said phase comparator means comprises:

two wave-shaping means, each connected to receive one of said two signals for shaping said signal; and means for determining which of said two signals arrives first and producing an output signal indicative thereof.

17. Apparatus as in claim 16 wherein said determining means of said phase comparator means is a D-type flip flop, a clock input of said D-type flip flop receiving one of said shaped signals and a D-input of said D-type flip flop receiving the other of said shaped signals.

18. A circuit as in claim 13 wherein said applying means comprises a D-type flip flop having a reset input connected to be reset by said output of said D-type flip flop of said determining means when the output indicates a reversed direction of said motor.

19. Apparatus as in claim 13 wherein a phase difference between said two signals is 90°.

20. A method for driving a motor in a recording/reproducing device which has a recording medium to be spun by said motor, comprising the steps of:

detecting a start signal for the motor;

driving said motor in a first direction in response to said start signal;

detecting a stop signal for the motor;

terminating said driving in said first direction, and driving said motor to produce torque in a second direction reversed to said first direction in response to said stop signal;

producing two signals which have a phase relationship depending on a direction of rotation of said driving means;

comparing said two signals to determine a direction of motion of said motor based on a relation between said two signals; and stopping said producing torque in said second direction when a direction of motion of said motor is detected to have become reversed.

21. Apparatus as in claim 20 wherein said comparing two signals comprises the steps of:
shaping said signals; and
determining which of said two signals arrives first and producing an output signal indicative thereof.

22. A method as in claim 21 wherein said determining step is performed by a D-type flip flop.

23. A method as in claim 20 wherein said signals have a 90° phase difference.

* * * * *